July 30, 1963 R. BELLINI 3,099,298
ROUTER ATTACHMENT FOR RADIAL SAW
Filed May 16, 1961
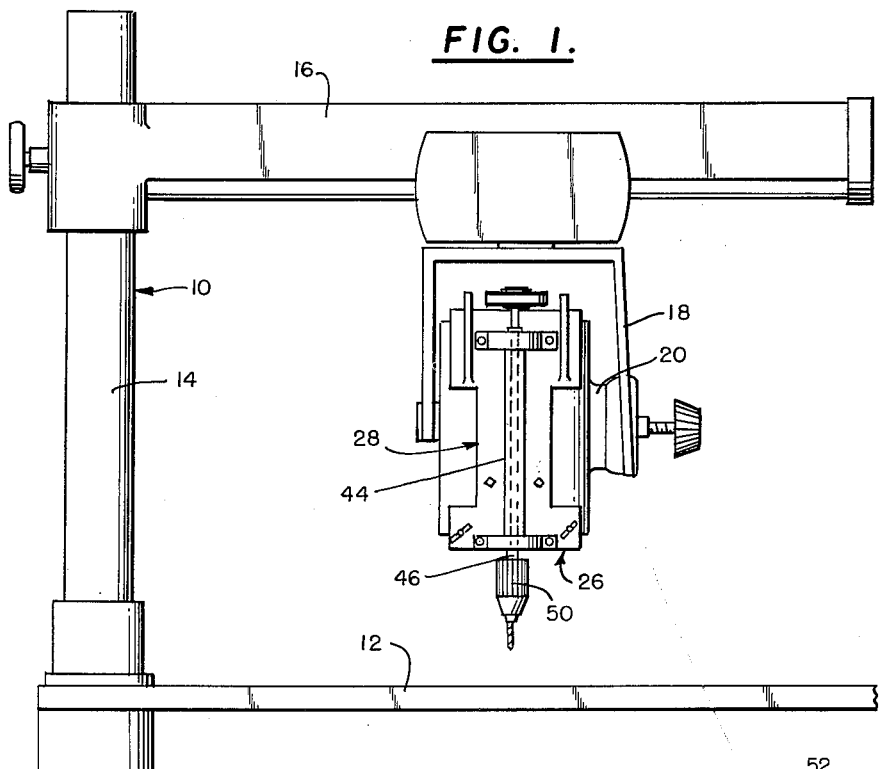
FIG. 1.
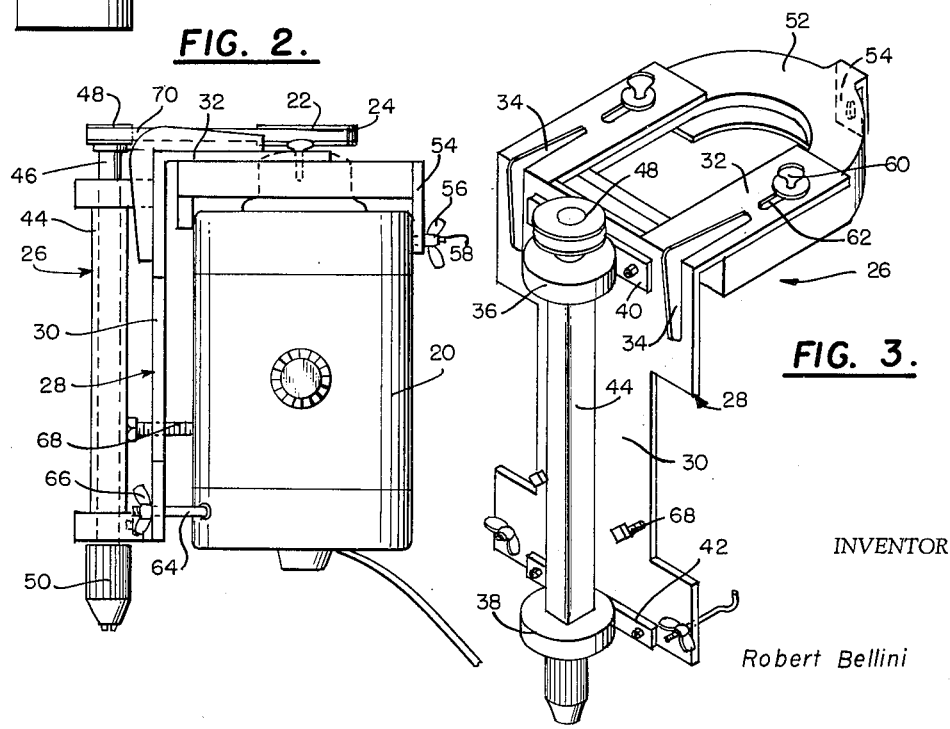
FIG. 2.
FIG. 3.
INVENTOR
Robert Bellini 3,099,298
ROUTER ATTACHMENT FOR RADIAL SAW
Robert Bellini, 511 2nd Ave. W., Twin Falls, Idaho
Filed May 16, 1961, Ser. No. 110,396
2 Claims. (Cl. 144—1)

The present invention relates to a router attachment for a radial saw.

An object of the present invention is to provide an attachment for a radial saw which converts the saw into a router, the router being so mounted as to be able to be tilted in any desired direction.

Another object is to provide a router attachment for a radial saw which lends itself to quick attachment to and detachment from a radial saw, one which is economical to manufacture, and one which is highly effective in action.

With these objects in mind, the invention is described as follows and with reference to the drawing, in which—

FIG. 1 is a side elevational view of a radial saw frame and motor with the saw blade removed and with the attachment of the present invention installed thereon, FIG. 2 is an elevational view, on an enlarged scale, of the motor of FIG. 1, with the attachment of the present invention installed thereon, and FIG. 3 is a perspective view of the attachment.

With reference to the drawing in detail, a radial saw frame 10 is shown in FIG. 1, and it includes a base 12, a standard 14, and an arm or overhead support 16 along which is normally guided a depending inverted U-shaped yoke 18 having mounted therein a motor 20. A rotary saw blade is usually mounted on one end of the shaft 22 of the motor 20 but is removed for the purpose of substitution of a pulley 24 (FIG. 2) for the blade.

The attachment of the present invention is designated by the numeral 26 and it consists in an L-shaped member 28 having a vertically disposed long leg 30 and a horizontally disposed short leg 32. Reinforcing ribs 34 extend along the junction of the legs 30 and 32, as shown most clearly in FIG. 3.

The leg 30 has on its outer face upper and lower bearing blocks 36 and 38 respectively.

The blocks 36 and 38 are mounted on strap elements 40, 42 which are bolted to the leg 30. Between the blocks 36 and 38 extends a shaft housing 44. A shaft 46 is journaled in the bearing blocks 36 and 38 and carries on its upper end a pulley 48 and has removably secured to its lower end a conventional tool chuck 50.

The usual saw guard of the radial saw is replaced by a U-shaped member 52 having a depending lug 54 on the bight thereof. A wing nut 56 holds the lug 54 on a stud bolt 58 which projects from the motor and is the normal means for securing the saw guard.

The leg 32 of the member 28 is bifurcated so as to permit mounting of the leg 32 on the member 52 so as to embrace the pulley 24 and with wing bolts 60 traversing slots 62 in the leg 32 and entering tapped holes provided in the member 52.

Hook bolts 64, with wing nuts 66, extend through the leg 30 and are hooked into holes provided in the lower end portion of the motor 20. Other bolts 68 are threaded in holes in the leg 30 and bear against the motor 20 so that the leg 30 may be kept parallel to the shaft of the motor 20.

A belt 70 travels over the pulleys 24 and 48 and rotates the shaft 46 when the motor 20 is in operation.

In use, any routing or moulding tool may be held in the chuck 50 and the work to be routed is secured to the base 12. The yoke 18 may be disposed at any angle to the vertical and may be rotated about a vertical axis as well. This permits universal movement of the tool in the chuck 50 to cut at any desired angle and in any direction as guided along the arm or support 16 and about the standard 14 as adjusted.

What is claimed is:

1. A router attachment for a radial saw of the character described, comprising an inverted L-shaped member having a short, basic, horizontally disposed leg member that is U-shaped when viewed from the top, the said leg member being divided into two parallel members each of which has an elongated opening in the outer end thereof for the reception of a wing bolt that extends downward into a second basic member that is also U-shaped when viewed from the top, the second U-shaped member taking place of the saw guard which is removed from the radial saw when said router attachment is secured to the said radial saw, and a shaft journaled in a pair of spaced bearing blocks mounted vertically in the center of the long leg of the said inverted L-shaped member, the said shaft having all but its ends encased in a housing, and a pulley mounted on the upper end of the said shaft which is provided with a tool chuck on its lower end in which is placed a routing tool, and an electric motor vertically mounted beneath the U-shaped members of and secured to, the said router attachment, the said motor being provided with a structure on each side thereof swingably supporting the said motor from and between the two downwardly extending and parallel members of an inverted U-shaped yoke that is a part of the said radial saw frame and manual means of locking the said electric motor and said router attachment to which it is secured at any desired angle to said U-shaped yoke when viewed from the end thereof, and a pulley mounted on the upper end shaft of the said electric motor which rotates the first mentioned pulley by means of a belt adapted to the first mentioned pulley and the pulley on the upper end shaft of the said electric motor.

2. A router attachment for a radial saw of the character described, comprising an inverted L-shaped member having a short, basic, horizontally disposed leg member that is U-shaped when viewed from the top, the said leg member being divided into two parallel members each of which has an elongated opening in the outer end thereof for the reception of a wing bolt that extends downward into a second basic member that is also U-shaped when viewed from the top, the second U-shaped member taking place of the saw guard which is removed from the radial saw when said router attachment is secured to the said radial saw, and a shaft journaled in a pair of spaced bearing blocks mounted vertically in the center of the long leg of the said inverted L-shaped member, the said shaft having all but its ends encased in a housing, and a pulley mounted on the upper end of the said shaft which shaft is provided with a tool chuck on its lower end in which is placed a routing tool, and an electric motor vertically mounted beneath the U-shaped members of and secured to, the said router attachment, the said motor being provided with a structure on each side thereof swingably supporting the said motor from and between the two downwardly extending and parallel members of an inverted U-shaped yoke that is a part of the said radial saw frame and manual means of locking together the said electric motor and said router attachment to which it is secured by a wing nut on the end of a stud bolt that extends horizontally outwardly from the back top side of the said electric motor through a lug that extends downwardly from the said second basic member that is U-shaped and also by a pair of spaced, horizontally mounted hook bolts and wing nuts extending from the lower end of the long leg of the said inverted L-shaped member, the said electric motor and router attachment being secured to said U-shaped yoke at any desired angle when viewed from the end thereof, and a pulley mounted on the upper end shaft of the said electric motor which rotates the first mentioned pulley by means of a belt adapted to the first mentioned pulley and the pulley on the upper end shaft of the said electric motor.

References Cited in the file of this patent
UNITED STATES PATENTS

| | | |
|---|---|---|
| 2,118,514 | Johnson | May 24, 1938 |
| 2,621,686 | Tompkins | Dec. 16, 1952 |